United States Patent [19]
Ladouceur

[11] 3,987,830
[45] Oct. 26, 1976

[54] PANEL ASSEMBLY

[75] Inventor: Harold A. Ladouceur, Livonia, Mich.

[73] Assignee: Multifastener Corporation, Detroit, Mich.

[22] Filed: Apr. 20, 1973

[21] Appl. No.: 353,049

Related U.S. Application Data
[63] Continuation-in-part of Ser. No. 149,517, June 3, 1971, abandoned.

[30] Foreign Application Priority Data

| | | |
|---|---|---|
| May 6, 1972 | Australia | 43106/72 |
| June 2, 1972 | United Kingdom | 25761/72 |
| June 2, 1972 | Canada | 143694 |

[52] U.S. Cl. ............... 151/41.73; 29/512; 29/522
[51] Int. Cl.² ............... F16B 39/282
[58] Field of Search ........... 151/41.73, 41.72, 41.75, 151/41.71, 7; 29/432, 432.1, 243.52, 512, 522, 509, 523; 10/86 R, 152 R; 285/382.4; 85/32 K, 32 R, 41, 47

[56] References Cited
UNITED STATES PATENTS

| | | | |
|---|---|---|---|
| 1,502,399 | 7/1924 | Renner | 151/41.72 |
| 1,600,665 | 9/1926 | Cocks | 85/41 UX |
| 2,004,182 | 6/1935 | Arey | 29/522 X |
| 2,061,269 | 11/1936 | Coakley | 29/512 X |
| 2,254,924 | 9/1941 | Williams | 29/512 X |
| 2,278,301 | 3/1942 | Bauer | 85/32 K X |
| 2,379,804 | 7/1945 | Johnson | 151/41.73 X |
| 3,221,533 | 12/1965 | Buys | 29/512 X |
| 3,234,987 | 2/1966 | Hentzi | 151/41.72 |
| 3,282,317 | 11/1966 | Zahodiakin | 151/41.73 |
| 3,438,299 | 4/1969 | Gutshall | 85/41 |
| 3,510,929 | 5/1970 | Kilmarx | 29/432 X |

FOREIGN PATENTS OR APPLICATIONS

| | | | |
|---|---|---|---|
| 918,090 | 9/1954 | Germany | 29/512 |

*Primary Examiner*—Ramon S. Britts
*Attorney, Agent, or Firm*—Cullen, Settle, Sloman & Cantor

[57] ABSTRACT

This disclosure relates to a nut and panel assembly and method wherein the panel is pierced into a nut chamber and the bolt threadably engages the panel. The disclosed nut includes a circular chamber which receives the pierced portion of the panel for threaded engagement by the bolt and a coaxially aligned smooth cylindrical passage which threadably receives the bolt.

1 Claim, 5 Drawing Figures

PANEL ASSEMBLY

RELATED APPLICATIONS

This application is a continuation-in-part application of my copending application for U.S. patent, Ser. No. 149,517, filed June 3, 1971, now abandoned.

FIELD OF THE INVENTION

The improved panel assembly of this invention is particularly suitable for securing the bolt or screw to a panel or the like. The assembly includes a nut which is first secured to the panel, a panel and a male threaded member such as a bolt or screw.

In the panel assemblies shown by the prior art, the screw or bolt is normally received through an aperture in the panel into a tapped opening in a nut or the like. Where a "self-tapping" screw is utilized, the nut may be affixed to the panel and the nut threads are thereafter formed by the screw. The driving torque of the self-tapping screw is however directly against the nut and may drive the nut off of the panel. In the panel assemblies shown by the prior art, the nut may be secured to the panel by deforming a portion of the panel into a nut cavity or chamber, however the assemblies diclosed by the prior art generally do not provide full engagement between the nut and panel around the panel aperture. In the panel assembly of this invention, the bolt or screw first threads into the panel, avoiding the forces tending to push the nut from the panel. Further, the bearing area between the panel and the nut is substantially increased, providing a three hundred sixty degree contact around the panel aperture.

The preferred embodiment of the nut disclosed herein includes an end portion adapted to be received against one face of the panel, a generally circular chamber opening through the end of the nut received against the panel and a coaxially aligned passage adapted to threadably receive a male threaded member such as a bolt or self-tapping screw. Upon receipt of the nut against the panel, the panel is pierced to provide a hole in registry with the nut chamber and deform the panel edges adjacent the pierced hole into the nut chamber.

Where a self-tapping screw is utilized in the assembly, the screw is then received through the panel aperture, opposite the nut, into threaded engagement with the panel portion received within the nut chamber, and then into threaded engagement with the wall defining the passage. The driving torque of the self-tapping screw is therefore directed first against the panel portion received within the nut chamber, rather than the nut, avoiding the push-off forces tending to drive the nut from the panel. Further, the nut provides full engagement with the panel adjacent the panel aperture.

The disclosed embodiment of the nut includes two coaxially aligned chamber portions; the first chamber portion adjacent the open end has a greater diameter than the second chamber portion, which communicates with the nut passage or aperture. The side wall of the first chamber portion is tapered radially outwardly from the open end of the chamber and terminates in a generally radial wall adjacent the second chamber portion, such that the pierced panel portion is retained in the first chamber portion.

The method of forming the nut and panel assembly described above then includes abutting the end face of the nut against the panel, piercing the panel in alignment with the nut bore with a piercing tool, or the like, which deflects portions of the panel axially within the area circumscribed by the chamber and radially outwardly into contact with the chamber walls, and defining a cylindrical bore coaxially aligned with the nut bore and of substantially the same inside diameter. The assembly is completed by threading a self-tapping screw or bolt in the pierced panel bore, forming a female thread in the panel bore and continuing to thread the screw into the nut bore, forming a continuous thread in the panel and nut bores.

Other advantages and meritorious features of the improved panel assembly of this invention will more fully appear from the following Description of the Preferred Embodiments, claims and drawings.

DESCRIPTION OF THE PREFERRED EMBODIMENT AND METHOD

Figure 1:
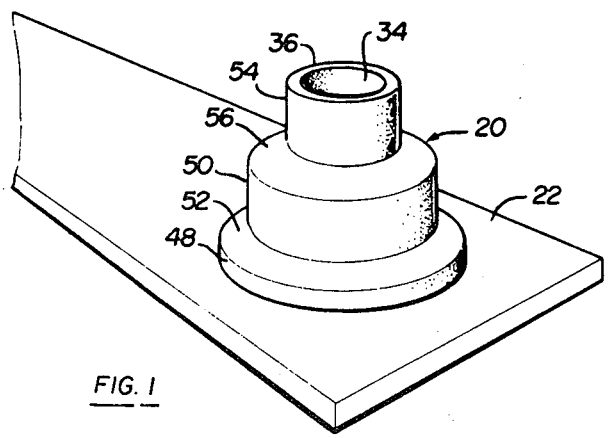
FIG. 1 is a perspective view of the panel assembly of this invention.
Figure 2:
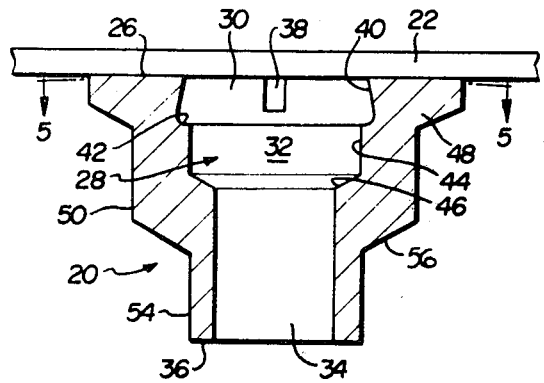
FIG. 2 is a side cross-sectional view of one embodiment of the nut received against a panel.
Figure 3:
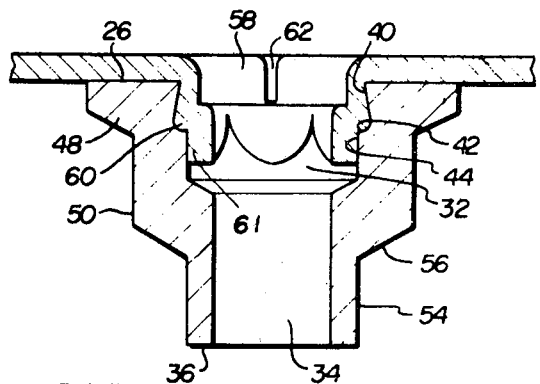
FIG. 3 is a side cross-sectional view of the embodiment of the nut shown in FIG. 2, after piercing of the panel.
Figure 4:
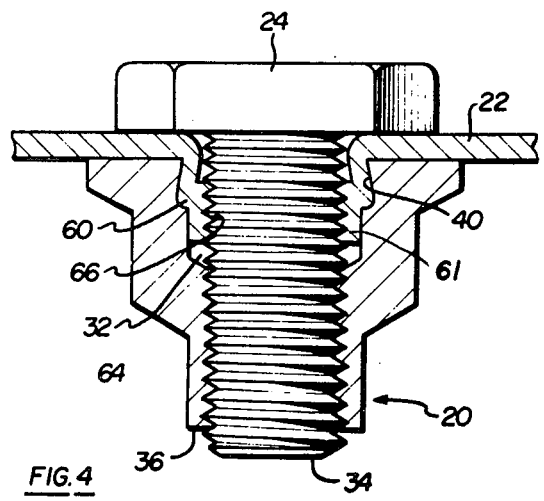
FIG. 4 is a side cross-sectional view of one embodiment of the panel assembly of this invention utilizing the nut shown in FIG. 1.
Figure 5:
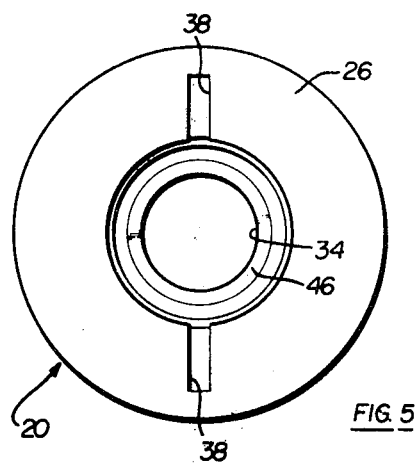
FIG. 5 is a top view of the nut shown in FIG. 2, in the direction of view arrows 5—5.

The panel assembly shown in FIGS. 1 to 5 includes a nut, generally indicated at 20, a panel 22 and a screw or bolt 24, as shown in FIG. 4. The disclosed embodiment of the nut includes a chamber 28 having an opening through end 26 to receive the pierced portion of the panel, as described hereinbelow. The nut chamber includes a first portion 30 adjacent the open end of the chamber and a second portion 32 which communicates with the coaxially aligned cylindrical passage 34 opening through the opposite end 36 of the nut. The passage 34 in the disclosed embodiment is not tapped, but threadably receives a "self-tapping" screw or other threaded fastener as described hereinbelow. A pair of radial slots 38 are also provided in the nut end 26 in the disclosed embodiment, as shown in FIG. 3, to prevent relative rotation between the nut and panel.

The first chamber portion 30 in the disclosed embodiment of the nut is defined by a generally conical, radially outwardly tapered undercut wall 40 which lockingly receives the pierced portion of the panel and terminates in a radial wall or stepped portion 42. The wall 44 of the second chamber portion 32 is generally cylindrical to receive the end of the pierced panel portion. The conical wall 46 joins the second chamber portion and the cylindrical passage 34.

The external configuration of the nut will depend upon the particular application. The disclosed embodiment of the nut includes a flanged portion 48 at the end 26 of the nut which is received against the panel 22. The nut body spaced from the panel includes a cylindrical portion 50, a tapered wall 52 joining the flanged portion and the cylindrical portion 50 and a cylindrical portion 54 at the opposed end 36 of the nut. A second tapered wall 56 joins the cylindrical portions 50 and 54.

The end 26 of the nut is received against the panel 22, as shown in FIG. 2, and supported for piercing or the like by a support, not shown. A cylindrical piercing tool, not shown, pierces a hole 58 in the panel in registry with the chamber 28 and deforms the pierced edges 60 of the panel into the first and second chamber portions, as shown in FIG. 3, locking the nut on the panel. The panel is also deformed by the piercing tool into the radial slots 38, as shown at 62, preventing rotation of the nut relative to the panel. In this embodiment, the panel is deformed outwardly against the tapered wall 44 of the first chamber portion 30 and against the step or radial wall 42, securely locking the nut on the panel.

Upon receipt of a self-tapping screw, or the like, as shown in FIG. 4, the threaded portion 64 of the screw is first received in the pierced panel portion 60, forming a plurality of threads 66 in the panel portion. Finally, the screw is received in the cylindrical passage 34, tapping the passage as shown in FIG. 4. It will be noted that the driving torque of the self-piercing screw first threads into the panel and therefore avoids the push-off forces until the screw is cutting. This feature substantially reduces the inadvertent pushing off of the nut, from the panel, during the assembly operation. Further, the disclosed embodiment of the nut provides full engagement between the nut and the panel at the pierced hole 58 in the panel, as shown at 26.

The method of making the panel assembly shown in FIG. 3 then includes engaging the panel 22 with the flanged end 26 of the nut. The flange 48 provides additional support for the nut. The panel is then pierced or punched, deforming the panel around the panel opening 58 into the nut chamber 28. The deformed panel edge includes a first portion 60 which is deformed against the undercut wall 40 of the nut chamber and a second cylindrical portion 61 closely conforming to the cylindrical wall 44 of the second cylindrical nut chamber 32. The first portion retains the nut in the nut chamber and the second cylindrical portion receives the self-tapping male threaded fastener, as described hereinbelow.

The cylindrical opening defined by the second panel portion 61 has an internal diameter substantially equal to and coaxially aligned with the cylindrical nut bore 34. The axial extent of the cylindrical panel portion is sufficient to receive a plurality of female threads, as described hereinbelow. The end of the panel edge is also preferably spaced from the opposed or confronting face 46 of the nut chamber to permit extrusion of the panel during threading, as described below. In the preferred embodiment, the panel is also deformed into the radial slots 62 to prevent rotation of the nut during threading and it will also be noted that the sharp edges formed by the piercing tool engage the cylindrical wall 32 of the chamber, also preventing relative rotation.

Finally, as shown in FIG. 4, a self-tapping screw or bolt is received in the panel opening 58, first threading the cylindrical portion 61 of the panel, then threading the nut bore 34 and finally drawing the panel and nut together. As described above, the axial extent of the cylindrical panel portion 61 preferably receives a plurality of full female threads 66, as shown in FIG. 4 which includes three or more threads. The panel edge is preferably spaced from the confronting wall 46 of the nut chamber to accommodate the panel as it is extruded during threading. The threading of the panel, prior to threading of the nut, prevents axial displacement of the nut under the torque of threading. The panel portion overlying the wall 40 also serves to guide the screw into the cylindrical panel opening 61 and prevent cross-threading. The axial bore 34 of the metal nut is then threaded, as shown in FIG. 4, forming a continuous female thread in the cylindrical portion 61 of the panel and the cylindrical bore 34 of the nut. Continued threading of the screw then draws the nut and panel tightly together, forming a secure panel assembly. In the preferred embodiment, the nut and panel are metal and the screw 24 includes self-tapping threads, to thread the nut and panel, as described above.

I claim:
1. A nut and panel assembly, comprising:
an integral metal nut having one end abutting one face of said panel and a passage extending through said nut having an axis generally normal to said panel face,
said nut passage including an enlarged chamber located adjacent said panel terminating in a generally cylindrical threaded bore having a diameter smaller than the maximum radial dimension of said chamber,
said chamber having a first portion adjacent said panel face and a second portion adjacent said threaded bore,
said first chamber portion having a greater diameter than said second chamber portion,
radially projecting antirotation means located within said first chamber portion,
said panel having a portion engaging said nut end,
a tubular panel portion displaced radially and axially within said first chamber portion and projecting axially within said second chamber portion,
said tubular panel portion terminating in an opening coaxially aligned with said nut bore,
the exterior surface of said tubular panel portion engaging the surface of said radially projecting antirotation means preventing relative rotation between said panel and said nut,
the interior surface of said tubular panel portion within said second chamber portion having a female thread,
said female thread having a pitch diameter substantially equal to the pitch diameter of said nut bore,
the interior surface of said tubular panel portion within said first chamber portion having a greater internal diameter than said threaded tubular portion,
a self-threading male threaded member having a pitch diameter generally equal to the pitch diameter of said threaded nut bore,
said male threaded member threadably received in said threaded tubular portion within said second chamber portion but spaced from said internal wall of said tubular portion within said first chamber portion and said first chamber portion extending axially a distance equal to at least one full thread of said male threaded member.

* * * * *